United States Patent [19]

Kobayashi et al.

[11] Patent Number: 4,930,119
[45] Date of Patent: May 29, 1990

[54] DUPLEX SYSTEM OF TRANSMISSION LINES IN A LOOP NETWORK

[75] Inventors: Kenzo Kobayashi, Kawasaki; Yutaka Iwagaki, Yokosuka; Mitsuyo Hasegawa, Tokyo; Kazushi Suganuma, Kawasaki, all of Japan

[73] Assignee: Fujitsu Limited, Kawasaki, Japan

[21] Appl. No.: 286,614

[22] Filed: Dec. 19, 1988

[30] Foreign Application Priority Data

Dec. 19, 1987 [JP] Japan .................................. 62-320134

[51] Int. Cl.5 ................................................ H04J 3/14
[52] U.S. Cl. .............................. 370/16.1; 340/825.01; 340/825.05; 340/8.27
[58] Field of Search ......................... 370/88, 16, 15, 86, 370/87, 24, 16.1, 16.15, 24, 85.12; 340/825.01, 825.05, 827; 379/5

[56] References Cited

U.S. PATENT DOCUMENTS

| | | | |
|---|---|---|---|
| 4,530,085 | 7/1985 | Hamada et al. | 370/15 |
| 4,542,496 | 9/1985 | Takeyama et al. | 370/16 |
| 4,593,154 | 6/1986 | Takeda et al. | 370/16 |
| 4,704,714 | 11/1987 | Tomizawa et al. | 370/15 |
| 4,831,617 | 5/1989 | Iwasaki | 370/16 |
| 4,835,763 | 5/1989 | Lau | 370/16 |

Primary Examiner—Douglas W. Olms
Assistant Examiner—Alpus H. Hsu
Attorney, Agent, or Firm—Staas & Halsey

[57] ABSTRACT

Disclosed is a duplex system of transmission lines in a loop network applied, for example, to a local area network. To realize an autonomous recognition of transmission line faults by each communication node and to enable a rapid and automatic reconstruction of a network, each communication node comprises a loop back circuit for effecting a loop back operation in response to a predetermined state of signals received from two directions of the duplex loop lines, and a return indication circuit for adding, to a transmitted signal a return indication that a received signal was returned when the received signal could not be passed through the node.

23 Claims, 14 Drawing Sheets

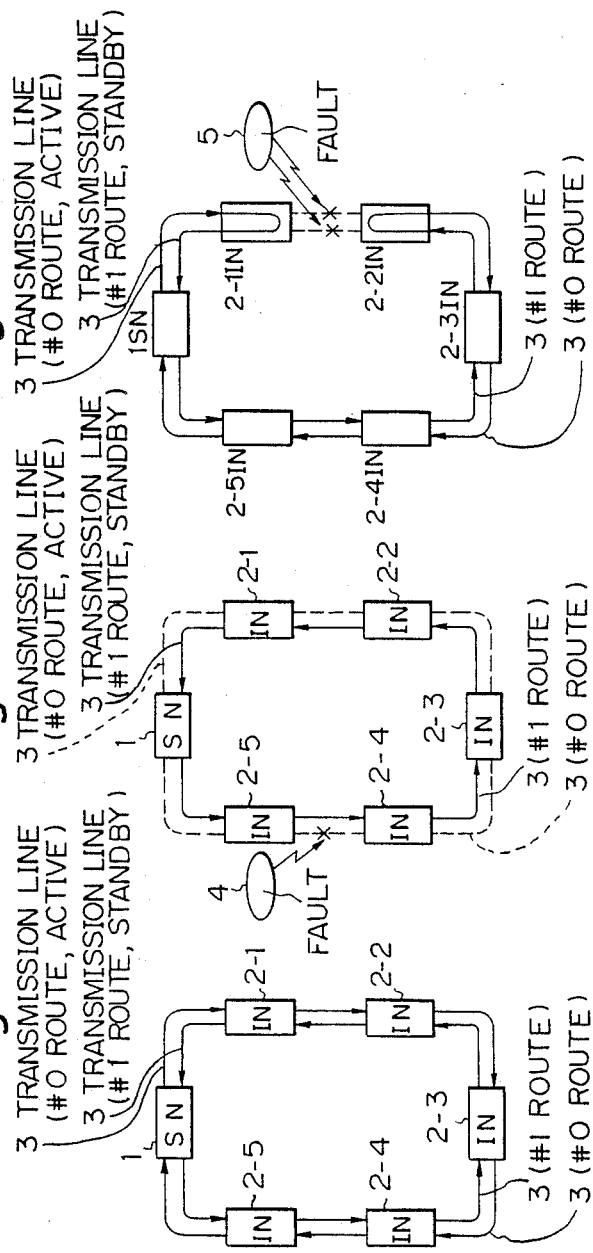

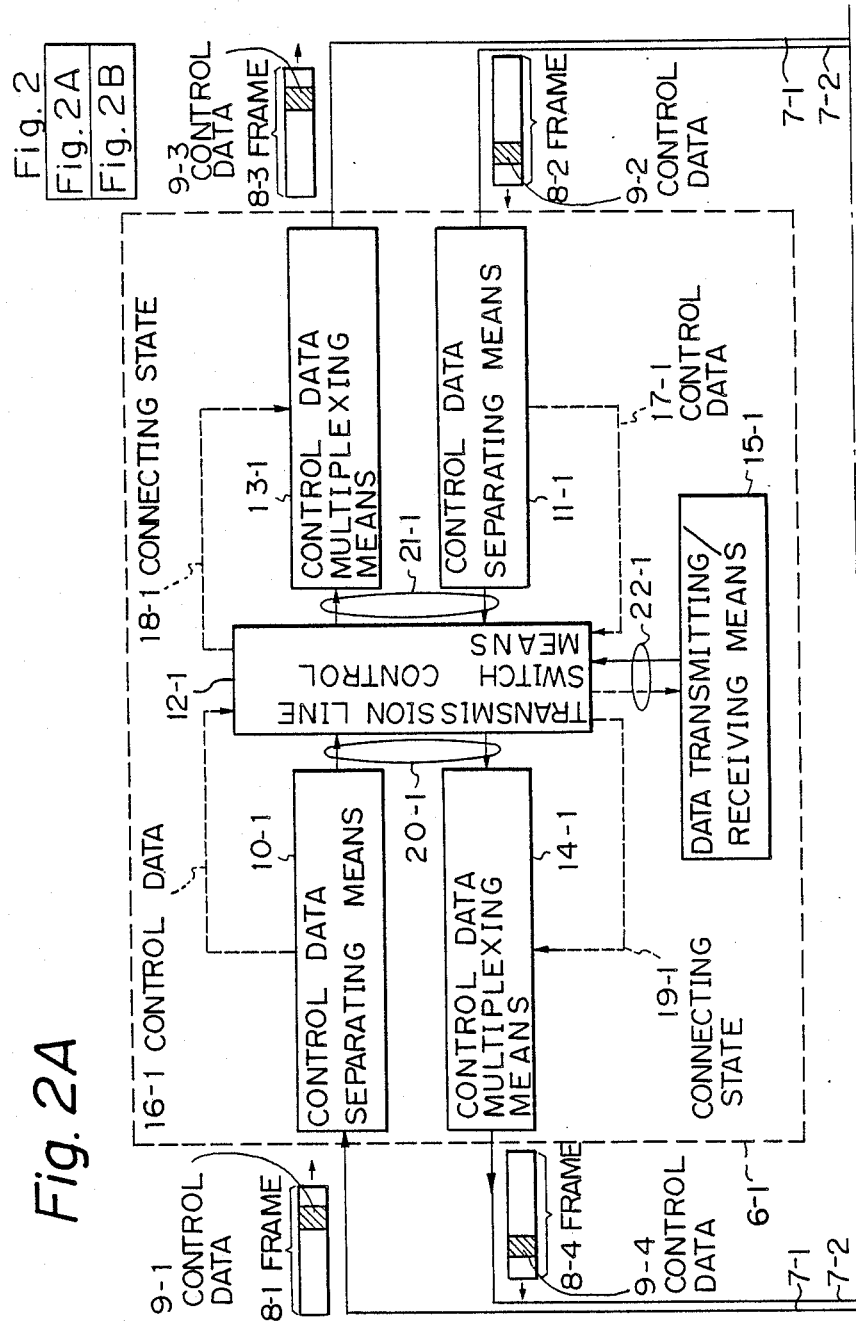

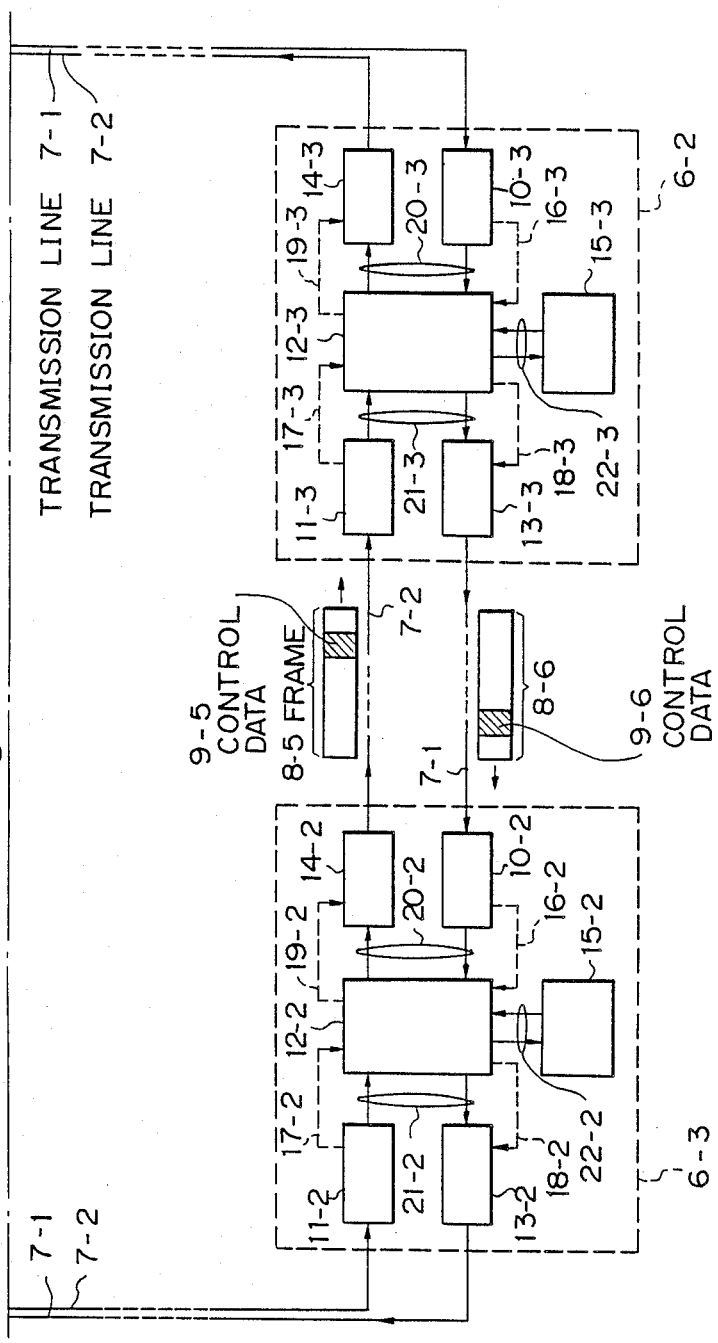

MASTER STATION (SN)

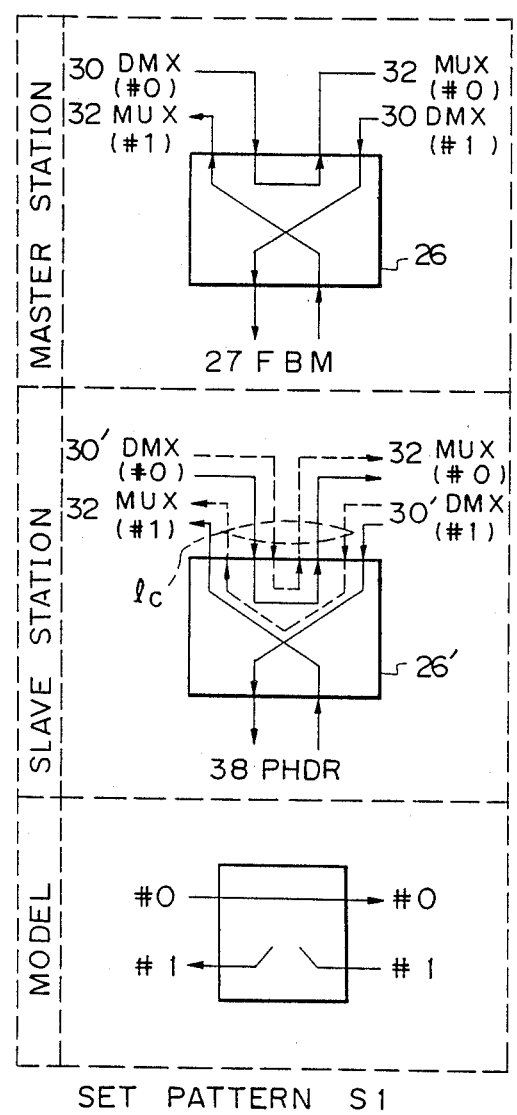

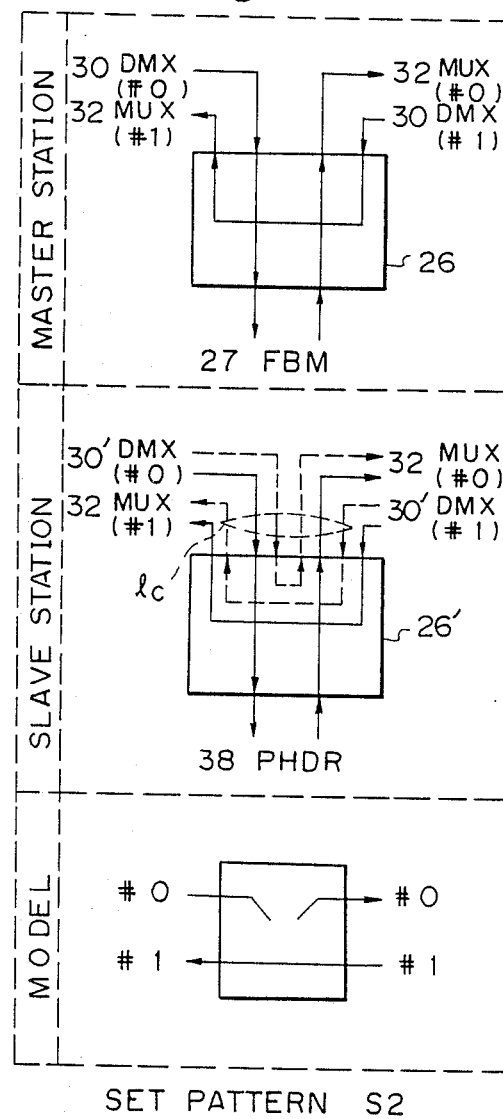

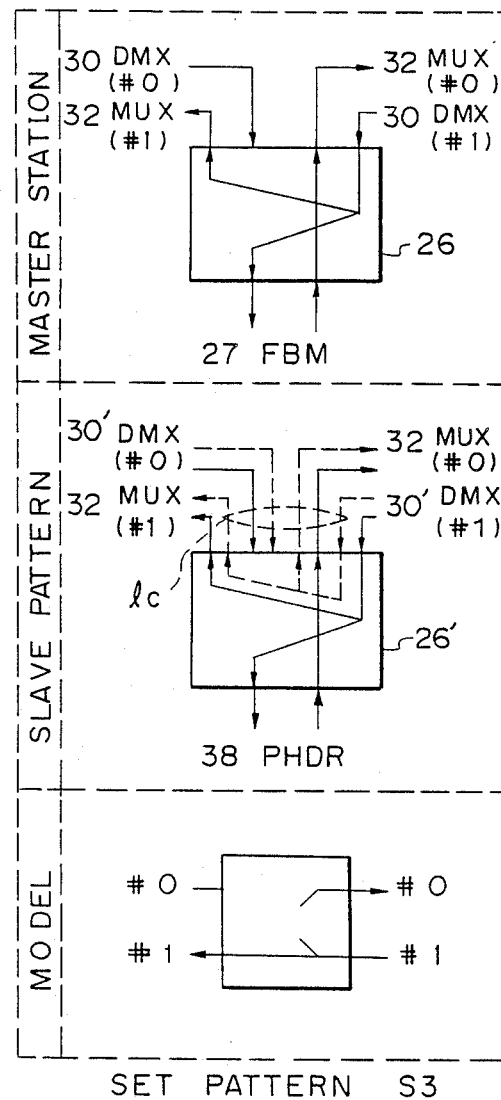

SET PATTERN S4

Fig. 6A

| | INPUT #0 | INPUT #1 | SW SET | OUTPUT #0 | OUTPUT #1 |
|---|---|---|---|---|---|
| 1 | A | A' | S2 | A | A' |
| 2 | A | B | S2 | A | B |
| 3 | A | X | S2 | A | B |
| 4 | A' | A | S1 | B | A |
| 5 | A' | B' | S1 | B | A |
| 6 | A' | X | S4 | B | A |
| 7 | B | A | S1 | B | A |
| 8 | B | B' | S2 | A | B |
| 9 | B | X | S2 | A | B |
| 10 | B' | A' | S2 | A | B |
| 11 | B' | B | S1 | B | A |
| 12 | B' | X | S4 | A | B |
| 13 | X | A | S1 | B | A |
| 14 | X | A' | S3 | A | B |
| 15 | X | B | S1 | B | A |
| 16 | X | B' | S3 | B | A |
| 17 | X | X | S2 | A | B |

MASTER STATION

Fig. 6B

| | INPUT #0 | INPUT #1 | SW SET | OUTPUT #0 | OUTPUT #1 |
|---|---|---|---|---|---|
| 1 | A | A' | S2 | A | A' |
| 2 | A | B | S2 | A | B |
| 3 | A | X | S4 | A | A' |
| 4 | A' | A | S1 | A' | A |
| 5 | B | A | S1 | B | A |
| 6 | B | B' | S1 | B | B' |
| 7 | B | X | S4 | B | B' |
| 8 | B' | B | S2 | B' | B |
| 9 | X | A | S3 | A' | A |
| 10 | X | B | S3 | B' | B |
| 11 | X | X | S5 | X | X |

SLAVE STATION

DUPLEX SYSTEM OF TRANSMISSION LINES IN A LOOP NETWORK

BACKGROUND OF THE INVENTION

1. Field of the Invention

The present invention relates to a loop network applied to a local area network (LAN), and more particularly, to a transmission line duplex system having duplex transmission lines to effect an automatic reconstruction of the network when faults occur in the transmission lines.

2. Description of the Related Art

In a LAN (local area network), a data exchange among a plurality of terminals between computers is made possible by interconnecting a plurality of communication nodes (communication control units) for accommodating terminals and so forth through a loop transmission line.

In general, an advantage of duplex transmission lines is that, even when a fault occurs in one of the transmission lines, another transmission line can be used to continue the data communication and thus a reliable system is obtained.

Also, by forming the duplex transmission lines as two loops for transmitting data in reverse directions, even when both of the two lines are cut, or when a fault occurs in a node, the data communication can be maintained at a minimum scale of the system through a loop back. In this case, the system operation is a degenerated operation.

In addition to the above-mentioned duplex line technology, when the system is recovered, it is necessary to reset the loop back or to expand the loop back to the recovered position of the system.

Based on the above, the present invention provides a system which enables the formation of a loop back and the resetting of each node (including a supervisory node), to obtain a flexible system operation.

As arts related to the present invention, the following publications are known:

(1) U.S. Pat. No. 4,542,496 disclosing a conventional loop back control technology;

(2) Japanese Unexamined Patent Publication (Kokai) No. 57-92,495 disclosing a prior art to the technology disclosed in the above U.S. Pat. No. 4,542,496;

(3) Japanese Unexamined Patent Publication (Kokai) No. 59-40,739 disclosing a loop back technology with a supervisory unit; and (4) Japanese Unexamined Patent Publication (Kokai) No. 59-57,544 disclosing a loop back control without a supervisory unit. The art disclosed in this document is an alternative to that of the above Japanese Unexamined Patent Publication (Kokai) No. 59-40,739.

In the above-mentioned related art, those directly related to the present invention are the publications (1) and (2).

In these related arts, however, a loop back control by commands from a supervisory unit is complex and requires several steps.

SUMMARY OF THE INVENTION

Accordingly, an object of the present invention is to provide a duplex system of transmission lines in a loop network in which each communication node can itself decide the state of the transmission line fault without the assistance of a supervisory node.

According to the present invention, there is provided a duplex system of transmission lines in a loop network composed of a plurality of communication nodes. Each of the nodes is provided with data transmission and reception means which are connected through duplex loop transmission lines for transmitting data in reverse directions.

Each of the communication nodes comprises: a loop back means for effecting a loop back operation in response to a predetermined state of a received signal from two directions of the duplex loop transmission lines; and a return indication means for adding, to an output signal, a return back indication that a received signal was returned when the received signal could not be passed through the node; whereby, in response to the signal received from two directions, each of the communication nodes autonomously executes or releases the loop back operation.

One of the communication nodes is a supervisory node having an active/standby indication means for adding, to the output signals to be transferred in the two directions of the duplex transmission lines, active/standby indications that each of the two directions is an active or a standby route.

When the two directions are assumed to be a #0 route and a #1 route, respectively, each of the communication nodes is provided with a switching means for switching, in response to the active standby indications of the received signals from the #0 route and the #1 route, between the two directions of the duplex transmission lines.

The supervisory node has switching means for switching, in response to the active standby indications of the received signals from the #0 route and the #1 route, between the two directions of the duplex transmission lines.

Each of the communication nodes has: switching means for switching the connection from the #0 route to the #1 route and from the #1 route to the #0 route; and control means for controlling the switching means based on the active standby indications in the signals received from the #0 route and #1 route, respectively.

The return indication means in each of the communication nodes has a means for adding the return indication to a returned signal when it is a result of a control by the switching means.

The control means in each of said communication nodes has a data table for storing a control pattern for driving the switching means; the control pattern including four kinds of receiving patterns consisting of active/standby and active return/standby return in the signal received from the #0 route; and the control pattern including four kinds of receiving patterns consisting of active standby and active-return/standby-return in the signal received from said #1 route.

Each of the communication nodes has a loop back releasing means for autonomously releasing the loop back operation when the node receives a predetermined pattern in the signals received from two directions.

The communication nodes comprise a supervisory node and subsidiary nodes.

The supervisory node has an active/standby indication means for adding, to the output signals to be transferred to the two directions of said duplex transmission lines, active/standby indications indicating that each of said two directions is an active or standby route #1. Each of the subsidiary nodes has a switching means for switching, in response to the active/standby indications of the received signals from the #0 route and the #1 route, between the two directions of the duplex transmission lines.

The supervisory node has a switching means for switching, in response to the active/standby indications of the received signals from said #0 route and said #1 route, between the two directions of the duplex transmission lines; and each of said subsidiary nodes has a switching means for switching the connection from the #0 route to the #1 route and from the #1 route to the #0 route; and a control means for controlling said switching means based on the active/standby indications in the signals received from the #0 route and #1 route respectively.

Each of the terminal nodes has a means for adding the return indication to a returned signal when it is a result of a control by the switching means; and the control means in each of the subsidiary nodes and the supervisory node respectively has data tables for storing a control pattern for driving the switching means.

Each of the communication nodes has a loop back releasing means for autonomously releasing the loop back operation when a node under the loop back operation in each of the subsidiary nodes or the supervisory node receives a predetermined pattern in the signals received from two directions.

According to another aspect of the present invention, in a duplex system of transmission lines in a loop network in which a plurality of communication nodes having a data transmission/receiving means are connected by duplex loop transmission lines for transmitting data in reverse directions, a transmission line duplex system in a loop network is characterized by; inserting control data indicating the connecting state of the each transmission line to each frame transmitted through each transmission line, and having, in each communication node, a control data separating means for detecting and separating, at a predetermined time interval, control data inserted to each frame which is input from each transmission lines; a transmission line switch control means for switching the connecting state between each input/output of each transmission line and the input/output of the data transmission/receiving means, based on the control data separated by each control data separating means; and control data multiplexing means for multiplexing new control data on each frame to be transmitted to each transmission line, based on the connection state; whereby, by the distributed control at each communication node, a control corresponding to the change of condition of the network is carried out.

BRIEF DESCRIPTION OF THE DRAWINGS

FIG. 1A is a general, configuration diagram of a duplexed loop LAN;

FIGS. 1B and 1C are diagrams explaining transitions from an active route to a standby route when a fault occurs in the active route;

FIG. 2A and 2B are a block diagram explaining the basic concept of the present invention;

FIG. 5A to 5E are diagrams illustrating setting patterns in switch parts and model diagrams of respective patterns, according to an embodiment of the present invention;

FIGS. 6A and 6B are diagrams illustrating switch settings and control data outputs for control inputs in the supervisory node and in one of the subsidiary nodes, according to an embodiment of the present invention;

DESCRIPTION OF THE PREFERRED EMBODIMENTS

Figure 3A:
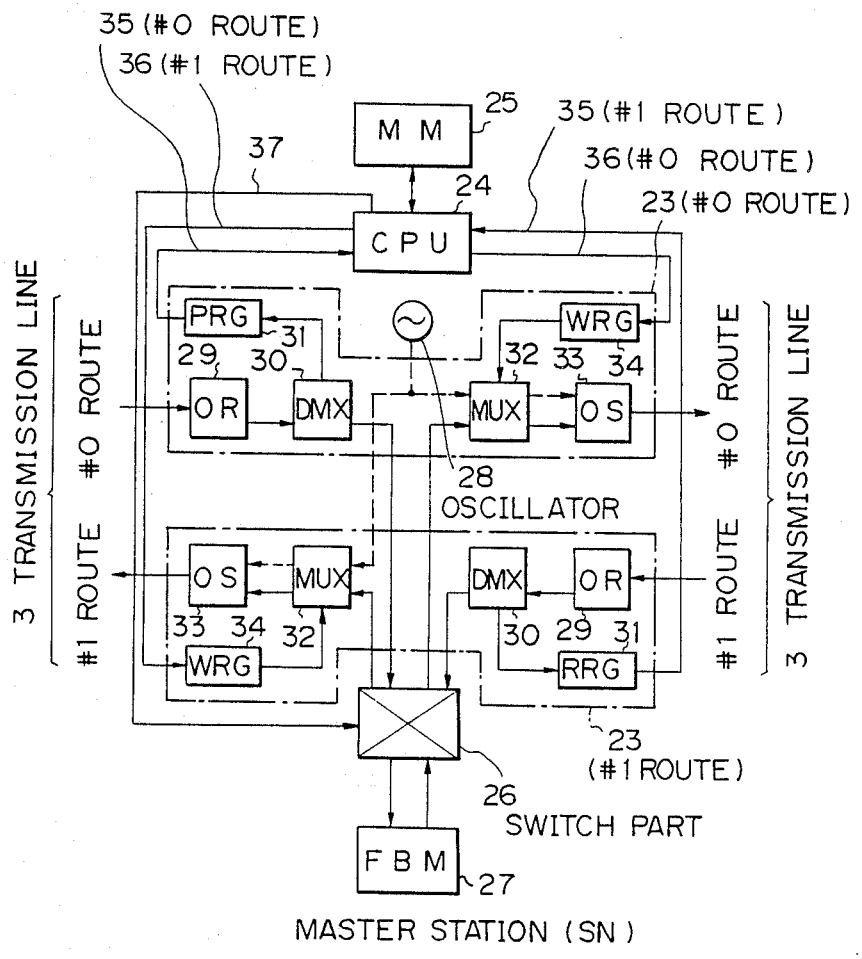
FIG. 3A is a block diagram explaining the construction of a supervisory node according to an embodiment of the present invention.

For a better understanding of the present invention a general configuration of a duplex system of transmission lines, which is the subject of the present invention, will be described with reference to FIGS. 1A to 1C.

FIG. 1A shows a general configuration of a duplexed loop LAN, in which a supervisory node (hereinafter SN) 1, which is a master station, and a plurality of interface nodes or communication nodes (hereinafter IN) 2-1 to 2-5 are connected by communication lines 3 which are constructed by #0 and #1 route duplexed loop optical fiber cables. Each IN2-1 to 2-5 usually transmits/receives communication data mutually by using, for example, the route transmission line 3 as an active or hot system, and the #1 route transmission line as a standby system.

In a loop network as mentioned above, when a fault in the transmission lines and a change of the state of the node occurs, a transmission line must be reconstructed.

FIGS. 1B and 1C are diagrams explaining transitions from an active route to a standby route when a fault occurs in the active route. In FIG. 1B, as an example, when a fault 4 such as breaking a line occurs in the transmission line 3 of the #0 route between IN 2-4 and IN 2-5, operation of the transmission line 3 is switched to the #1 route. Also, as shown in FIG. 1C as an example when faults 5 occur in the transmission lines of both the #0 route and the #1 route, the network is reconstructed to continue the operation by a loop back from the transmission line of the #0 route to the transmission line of the #1 route (hereinafter loop back).

To reconstruct the network as mentioned above with reference to FIGS. 1B and 1C, conventionally the SN 1, which is the master station, periodically receives control information giving the state of the transmission line 3 from each of the INs 2-1 to 2-5, to collectively control the state of the whole network. When a fault occurs, the SN 1 determines the state thereof and transmits control information to each INs 2-1 to 2-5 to control switch (not shown) in each IN, so that the transmission line is switched between the #0 route and the #1 route, or a network is reconstructed by effecting a loop back. That is, each of the INs 2-1 to 2-5, which are slave stations, operate in accordance with instructions from the SN 1, which is a master station.

The problems to be solved by the present invention will be described as follows. In the above-mentioned general configuration, when each of the INs 2-1 to 2-5 detects a fault, the detection is conventionally effected by using only the information stating whether a communication signal is normally input from each transmission line 3 of the #0 route and the #1 route. Therefore, the SN1 cannot determine the details of the fault.

Therefore, in the prior art, a loop back control by commands from a supervisory unit requires several steps.

For example, in the above-mentioned document (2), the supervisory node sequentially determines whether or not respective subsidiary or slave nodes (terminals) are normal, by interrogation commands, forming a loop back between predetermined nodes.

In the above-mentioned document (3), a supervisory node transmits a loop back start command to respective subsidiary nodes simultaneously, and then the supervisory node transmits a loop-back reset command to each subsidiary node. When the loop-back reset commands are received from both of the two transmission lines in each subsidiary node, the loop back is reset so that a loop back is formed between predetermined nodes. This control requires a smaller number of control steps than the control in the document (2).

Nevertheless the controls in both documents (2) and (3), require a predetermined number of control steps for executing a loop back operation.

In document (4), to detect a fault by each node, the node determines whether or not a normal signal has been input from respective transmission lines.

None of these documents, however, discloses an expansion of a loop back, because the control is too complex and the technology for the expansion has not been considered. It is difficult in the prior art to control the expansion of the loop back operating interval at a midway point, and thus a problem arises in that flexible operation is impossible.

After forming a loop back, the reset, which can be considered by a person skilled in the art, may be carried out as follows. As a simple method, all of the nodes are initialized to be reset and then the system is operated from the initial state. In this method, however, all of the nodes located at respective positions must be initialized, and thus a problem arises in that these procedures require much labor and time.

Also, referring to FIGS. 1A to 1C, as a sequence for reconstructing a network, the SN 1 periodically receives control information from each of the INs 2-1 to 2-5 and then, in accordance with that information sequentially transmits control information to each of the INs 2-1 to 2-5. Therefore, to change the construction of the system, a complex control sequence involving several steps is necessary, which brings a problem of a long processing time.

Further, in this case, if the fault is changed or recovered, a problem arises in that a normal process can not be guaranteed. The reason for this is as follows.

To initially reset all of the subsidiary nodes by a supervisory unit, the following control, which is not prior art, may be considered:

(1) the supervisory node determines the receiving states of respective nodes;

(2) the supervisory unit acknowledges that the node isolated by the loop back is reset;

(3) the supervisory unit transmits a reset command to a node which is in the loop back operation; and (4) the supervisory unit specifies an active route. The above-mentioned control, however, is very complex. In a fully distributed system, if operation of a node is to be restarted in response to only input signals, it is often difficult to determine which of the two lines should be used as an active route, when the input signal from one side of the loop is a #0 route signal and the input signal from another side of the loop is a #1 route signal. In this case, the node which started the loop back operation must function as a supervisory node. Therefore, each node must have a supervisory node function.

The present invention was created based on the above circumstances.

To solve the above-mentioned problem, the object of the present invention is to enable each communication node to independently or autonomously decide the state of the transmission line fault and so forth, so that an autonomous and rapid reconstruction of the network can be made by a simple distributed control.

Embodiments of the present invention will now be described.

FIGS. 2A and 2B form a block diagram explaining the basic concept of the present invention. For example, a plurality of communication nodes 6-1, 6-2, 6-3 . . . . having data transmitting/receiving means 15-1, 15-2, 15-3 . . . , such as data terminal equipment and so forth, are connected by duplexed loop transmission lines 7-1, 7-2 for transmitting data in reverse directions. These transmission lines are realized as LAN's (local area networks) constructed by, for example, optical fibers.

In the present invention, control data 9-1, 9-2, . . . indicating the connecting states of the respective transmission lines 7-1, 7-2 is input to frames 8-1, 8-2 . . . , which are communication signals transmitted and received among respective communication nodes 6-1 . . . , and transmitted through each transmission line 7-1, 7-2.

Each of the communication nodes 6-1 . . . , has a control data separating means 10-1, 11-1, . . . for detecting and separating, at a predetermined time interval, control data 9-1, 9-2 . . . inserted to each frame, for example, 8-1, 8-2 . . . , which is input from each transmission lines 7-1, 7-2 and further, has a transmission line switch control means 12-1, . . . for switching the connecting state between each input/output 20-1, 21-1, . . . of the transmission lines 7-1, 7-2 and the input/output 22-1, . . . of the data transmission/receiving means 15-1, . . . , based on each control data 16-1, 17-1 . . . separated thereby, and still further, has a control data multiplexing means 13-1, 14-1 . . . for multiplexing new control data 9-3, 9-4, . . . on each frame of, for example, 8-3, 8-4, . . . , to be transmitted to each transmission line 7-1, 7-2, based on the connection state 18-1, 19-1 (the same) in both means.

In the above-mentioned means, when a fault occurs in, for example, the transmission lines 7-1, 7-2, the receiving state of each control data 9-1 . . . in each control data separating means 10-1, . . . of each communication node 6-1, . . . is output, and the transmission line switching means 12-1, . . . receives this data change and switches, in accordance with a predetermined rule, the connecting state between each input/output 20-1, 21-1, . . . of the transmission lines 7-1, 7-2 and the input/output of the data transmitting/receiving means 15-1, . . . Further, each control data multiplexing means 13-1, 14-1, . . . receives this data so that the control data 9-3, 9-4, . . . to be inserted into the transmitted frame 8-3, 8-4, . . . is changed in accordance with a predetermined rule. Then, the frames 8-3, 8-4, . . . are transmitted to the other communication nodes and the states therein are also changed.

As described above, by enabling each communication node to change its own connecting state using the control data, a network can be independently or autonomously reconstructed without assistance by the master station. In this case, the connecting state switching rule in the transmission line switching control means 12-1, ... corresponding to the state change of the input control data 9-1 (16-1), ..., and the rule for changing the control data in the control data multiplexing means 13-1, 14-1, ... corresponding to the change of the connecting state therein, can be previously determined. Therefore, by storing these rules, for example, as tables, in each transmission line switching control means, the above-mentioned operation can be realized by effecting a simple control to shift to a new state with reference to the tables when the state is changed, so that a rapid reconstruction of a network is possible. Further, when the above-mentioned rules are realized by hardware such as a sequence circuit and so forth, an even higher speed control can be effected.

Figure 3B:
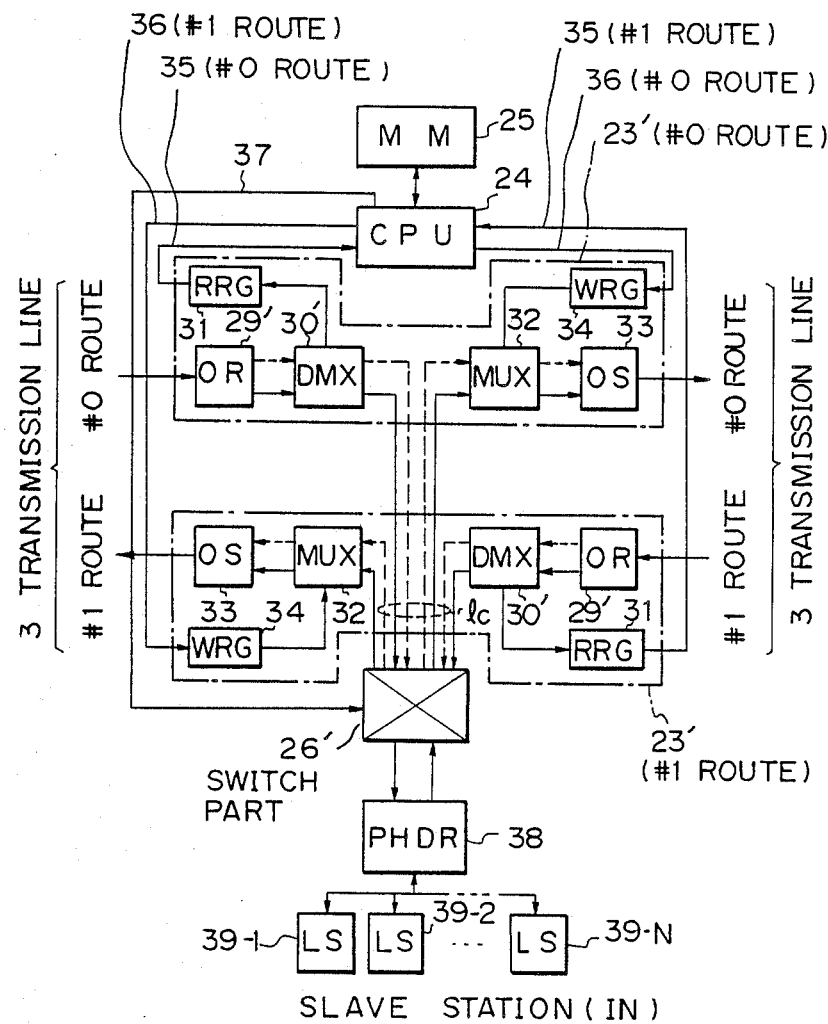
FIG. 3B is a block diagram explaining the construction of a subsidiary node according to an embodiment of the present invention.

Embodiments of the present invention will now be described in detail as follows. First, the general configuration of the loop network which is the subject of the present invention is the same as that shown in FIG. 1A, and therefore, a description thereof is omitted. Next, FIGS. 3A and 3B are construction diagrams of an embodiment of the present invention. First, FIG. 3A shows the construction of a supervisory node SN1 (hereinafter master station), which has functional blocks of exactly the same construction, as shown by dash-dot lines 23, corresponding to each transmission line 3 of the #0 route and the #1 route.

That is, an optical signal input from the transmission line 3 of the #0 route is converted into an electrical signal in an optical/electrical converting circuit, i.e., an optical signal receiver (hereinafter OR) 29, and then input to a frame decomposition/data separation circuit (hereinafter DMX) 30.

In the DMX 30, control data (later described in more detail) is separated from a signal having a frame format input, as an electrical signal, is output from a read register (hereinafter RRG) 31 through a control line 35 to a central control unit (hereinafter CPU) 24, and the other data is input to switch part 26.

On the other hand, communication data from the switch part 26 is input to a frame generating circuit (hereinafter MUX) 3 in which the data is multiplexed with control data input from the CPU 24 through a control line 36 and a write register (hereinafter WRG) 34, and further, after synchronization is established with a clock input from a generator 28, a frame signal is assembled and output to an electrical/optical converting circuit, i.e., an optical sending circuit (hereinafter OS) 33, and then, after being converted in the OS 33, to an optical signal, is output to the transmission line 3 of the #0 route. The above-described construction of the parts 23 in FIG. 3A is the same for both the #0 route and the #1 route.

Next, the switch part 26 arbitrarily connects the inputs from the respective DMX's 30 of the #0 route and the #1 route and the input from a frame delay compensating circuit, in other words, a frame buffer memory (hereinafter FBM) 27 with the outputs of the respective MUX's 31 and the FBM 27. The FBM 27 is used for compensating the delay of the frame signal (described later) transmitted through the transmission line 3.

The CPU 24 changes the setting state of the switch part 26 based on the control data input through the control line 35 and outputs new control data through the control line 36.

A main memory (hereinafter MM) 25 stores a program for carrying out the above-mentioned operation, and the tables (described later).

Next, FIG. 3B shows the construction of one of the communication nodes IN 2-1 to 2-5 (hereinafter slave station) which has basically the same function as the master station of FIG. 3A. In the actual slave station, however, since the terminals and so forth for communication are connected, the switch part 26' (corresponding to 26 in FIG. 3A) is connected to a data processing circuit (packet handler) (hereinafter PHDR) 38. A plurality of communication terminals (not shown) are connected to the PHDR 38 through respective line set circuits (hereinafter LS) 39-1, ....

Also, an OR 29' in 23', (corresponding to 23 in FIG. 3A) has, in addition to the function of the OR 29 in FIG. 3A, a function to extract clocks from the receiving signal. The extracted clocks are input through the DMX 30' into the switch part 26'. The switch part 26' has, in addition to the function to arbitrarily connect the communication data input from the respective DMX's 30' of the #0 route and the #1 route to the outputs of respective MUX's 32 and the outputs of the PHDR 38, a function to directly and arbitrarily connect the clock inputs (a part of the dash line group lc) from the respective DMX's 30' of the #0 route and the #1 route to the clock outputs (a part of the dash line group lc) without passing through the PHDR 38.

Figure 4:
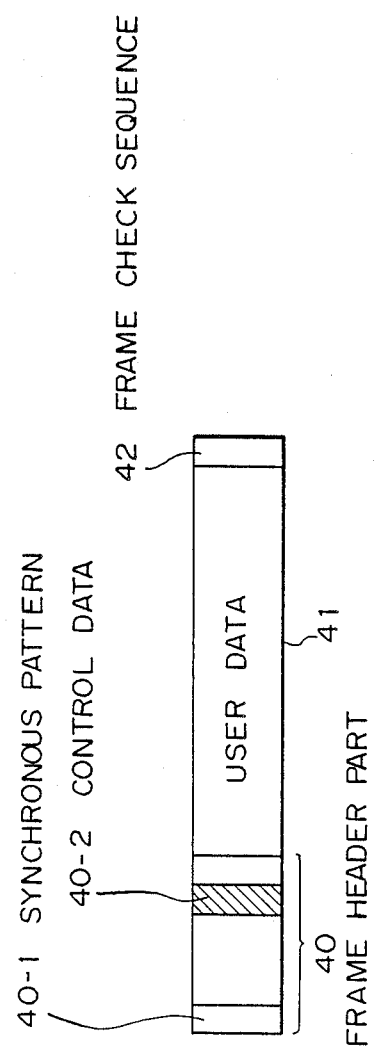
FIG. 4 is a frame construction diagram of an embodiment of the present invention.

Next, FIG. 4 is a construction diagram of the frame signal transmitted through the transmitting line 3 of the #0 route and the #1 route. Roughly divided, it consists of a frame header part 40, user data 41, and a frame check sequence 42. The user data 41 is communication data transmitted/received between the terminals connected to different slave stations, and the frame check sequence 42 is a bit pattern for error detection and error correction for the transmitting frame. In the frame header part 40, a frame identifying synchronous pattern 40-1 is inserted to the head part, and control data 40-2, which is the characterizing feature of the present invention, is also inserted therein. This will be described later.

Next, the upper portions of FIGS. 5A to 5E show the set patterns in the switch parts 26 of the master station; the middle portion of FIGS. 5A to 5E show the set patterns in the switch part 26' of a slave station; and the lower portions in FIGS. 5A to 5E are their corresponding model expressions. The difference between the master station and the slave station is that the slave station, as mentioned before, has the function for directly connecting the input from the DMX 30' to the output of the MUX 32. This function, however, is not directly related to the present invention.

The set pattern S1 in FIG. 5A shows a case in which the input and the output of the transmission line 3 of the #0 route are directly short circuited, and the input and the output of the transmission line 3 of the #1 route are respectively connected to the output and the input of the FBM 27 or the PHDR 38, so that the operation is carried out by the transmission line 3 of the #1 route.

The set pattern S2 in FIG. 5B shows the case in which, contrary to the above case, the operation is carried out by the #0 route.

The set pattern S3 in FIG. 5C shows the case in which the #1 route is short circuited and the #1 route is input to the FBM 27 or the PHDR 38, and the output thereof is output to the #0 route so that a loop back operation is carried out from the #1 route to the #0 route.

Figure 5D:
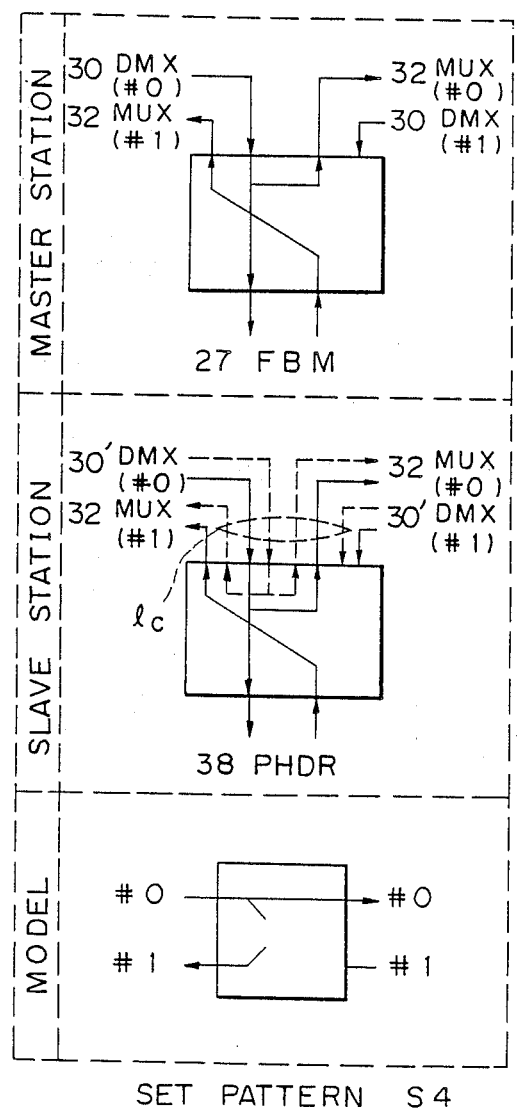

The set pattern S4 in FIG. 5D shows the case in which, converse to the above, the #0 route is short circuited and the #0 route is input to the FBM 27 or the PHDR 38, and the output thereof is output to the #1 route so that the loop back operation is carried out from the #0 route to the #1 route.

Figure 5E:
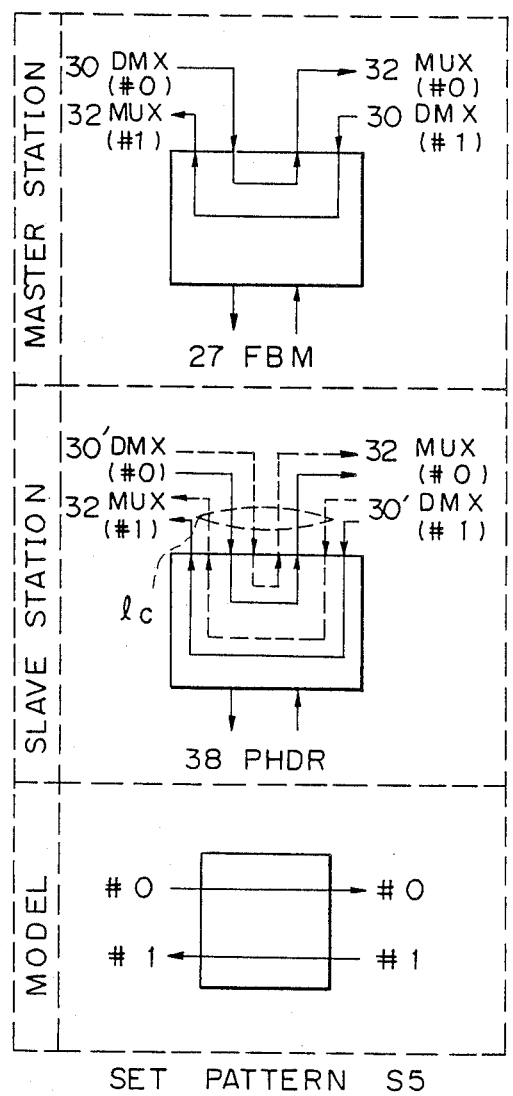

The set pattern S5 in FIG. 5E shows the case in which both the #0 route and the #1 route are short circuited, and thus that station is not used.

The above-mentioned set patterns S1 to S5 are realized by the CPU 24 in FIG. 3A or 3B by controlling the switch part 26 or 26′ through the control line 37.

Next, a practical operation of the present embodiment is described. First, the DMX 30 or 30′ of the #0 route and the #1 route in FIG. 3A or 3B separates only the control data 40-2 from the frame signal input with the format shown in FIG. 4 and inputs the data from the RRG 31 of each route through the control line 35 to the CPU 24. Conversely, the control data output from the CPU 24 through each control line 36 and WRG 34 is inserted and transmitted by the MUX 32 of each route as control data 40-2 of the frame signal shown in FIG. 4.

In the master station (FIG. 3A), the MM 25 has a table shown in FIG. 6A, and in the slave station (FIG. 3A), the MM 25 has a table shown in FIG. 6B. The CPU 24 of the master station or the slave station accesses the MM 25 in response to the aforementioned control data from the respective RRG's 31 by the #0 route and the #1 route, to refer to the table show in FIG. 6A or 6B, and first determines the set pattern of the switch 26 or 26′ to perform the control of the respective switches via the control line 37.

In each table in FIGS. 6A or 6B, there are four kinds of marks A, A′, B and B′ in the control data. The mark X in the input control data indicates that the respective DMX's 30 in the master station (FIG. 3A) or the respective DMX's 30′ in the slave station (FIG. 3B) did not receive the control data within a predetermined time. That is, the mark X indicates that the CPU 24 did not receive the control data within a predetermined time.

The mark A in the control data input or output from or to the #0 route or the #1 route indicates that the route is an active route.

The mark A′ in the control data input or output from or to the #0 route or the #1 route indicates that the route is a loop back route of an active route returned from any one of the master station or the slave stations.

The mark B in the control data input or output from or to the #0 route or the #1 route indicates that the input route is a standby route.

The mark B′ in the control data input or output from or to the #0 route or the #1 route indicates that the route is a loop back route of a standby route returned from any one among the master station and the slave stations.

The switch setting pattern S1, S2, S3, S4 or S5 in the master station or in each of the slave stations is determined by a permutation of two of the five marks A, B, A′, B′, and X in the input control data.

The marks in the output control data on the #0 route and the #1 route from the master station or from each of the slave stations are determined by the combination of the input marks and the switch setting pattern.

The marks A, B, A′, B′, and X constitute the control data in the frame format shown in FIG. 4. Therefore, in the following, the marks are referred to as the control data. A practical control operation using the above-mentioned tables will be described with reference to the practical example shown in FIG. 7A and 7B.

Figure 7A:
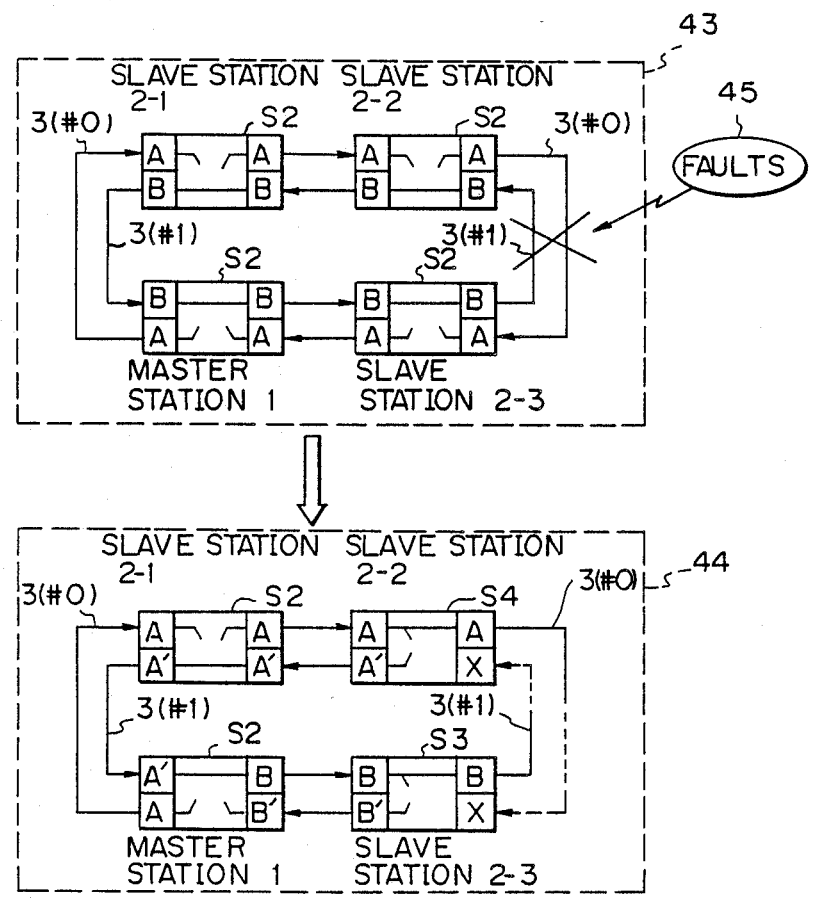
FIG. 7A is a diagram explaining a transition from the #0 route operation to a loop back operation, according to an embodiment of the present invention.

FIG. 7A shows an example of a change from the #0 route operation to a loop back operation. As shown in FIG. 7A by dash lines, assuming that a loop network (corresponding to FIG. 1A) consisting of the master station (SN) 1 and the slave station (IN) 2-1 to 2-3 is provided, and when a fault 45 has not yet occurred, the setting of the switch in each station is assumed to be fixed to the pattern S2 shown in FIG. 5B so that the operation is carried out by the #0 route, then the control data A is input to the inputs of the #0 routes of the respective stations, and the control data B is input to the inputs of the #1 routes.

As long as the switch in each station is fixed to the pattern S2, each station outputs the control data A, which is the same as the input control data A from the #0 route, to the #0 output route, and outputs the control data B′ which is the same as the input control data B from the #1 route, to the #1 output route, as can be seen from the tables shown in FIGS. 6A and 6B.

Here, if faults 45 occur in both the #0 route and the #1 route of the transmission line 3, the state is changed to the state shown by the dash line 44. That is, first, in the slave station 2-2, the control data A is input from the #0 route, but the control data is not input to the input from the #1 route. Therefore, with reference to the third row from the top in the table of FIG. 6B, the input control data "A-A′" the switch setting is changed to the state S4 shown in FIG. 5D so that a loop back operation from the #0 route to the #1 route is carried out in the slave station 2-2. Simultaneously, the control data A is output to the output of the #0 route and the control data A′ is output to the output of the #1 route.

When this data is received in the slave station 2-1, the control data A is input to the input of the #0 route, and the control data A′ is input to the input of the #1 route. But as can be seen from the top row of the table shown in FIG. 6B, the switch setting is kept at the pattern S2 of FIG. 5B without change, and the control data A is output to the #0 route and the control data A′ is output to the #1 route.

On the other hand, in the slave station 2-3, the control data B is input to the input of the #1 route and the control data is not input to the input of the #0 route. Accordingly, since the input data permutation is "XB", referring to the tenth row of the table shown in FIG. 6B, the switch setting changes to the pattern S3 shown in FIG. 5C so that the loop back operation from the #1 route to the #0 route is carried out. In this case, the control data B′ is output to the #0 route and the control data B is output to the #1 route.

Further, in the master station 1, matching the operation of the above-mentioned slave stations 2-1 to 2-3, when the control data B′ is input to the input of the #0 route and when the control data A′ is input to the #1 route, the switch setting is kept at the pattern S2 as shown in FIG. 5B, as can be seen from the tenth row of the table shown in FIG. 6A, and the control data A is output from the output of the #0 route and the control data B is output from the output of the #1 route.

As a result of the above operation, if the faults 45 occurs during the operating condition as shown by the dash line 43, each station performs its own distributed control to change to the state as shown by dash line 44, so that the transmission lines 3 of the slave stations 2-2 and 2-3 are looped back, to reconstruct the network.

Figure 7B:
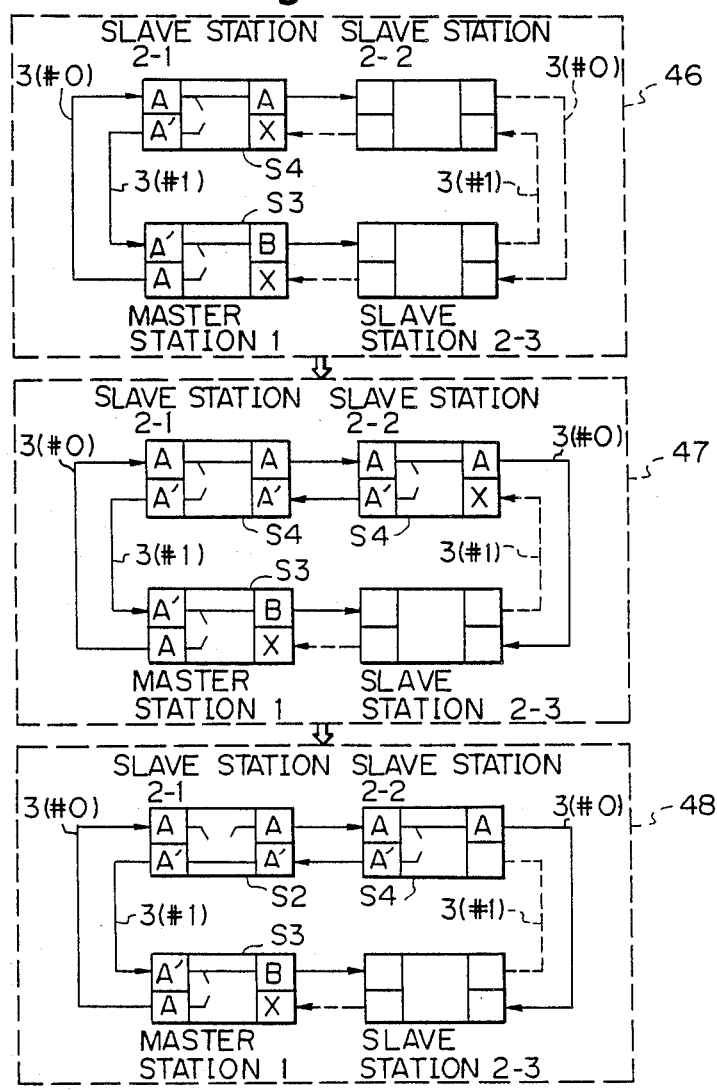
FIG. 7B is a diagram explaining a transition to a loop back expansion, according to an embodiment of the present invention.

FIG. 7B shows an example of a loop back expansion. As shown by the dash line 46 in FIG. 7B, the case in which a loop back operation is carried out only between the slave station 2-1 and the master station 2-3 is considered, and a power source, for example, is not thrown for the slave stations 2-2 and 2-3. In this case, in the slave station 2-1, the control data A is input to the input of the #0 route but no control data is input to the input of the #1 route. Therefore, referring to "AX" in the third column of the table shown in FIG. 6B, the switch setting is the pattern S4 as shown in FIG. 5D, so that the loop back operation from the #0 route to the #1 route is carried out at the slave station 2-1 and the control data A is output from the output of the #0 route and the control data A' is output from the output of the #1 route.

In the master station 1, to match this, the control data A' is input to the input of the #1 route and no control data is input to the input of the #0 route. Therefore, as can be seen from the fourteenth row in the table shown in FIG. 6A, the switch setting in the master station becomes as shown by the pattern S3 of FIG. 5C. As a result, a loop back operation from the #1 route to the #0 route is performed so that the control data A is output from the output of the #0 route and the control data B is output from the output of the #1 route.

In the above state, when a power source is thrown, for example, at the slave station 2-2 as illustrated by the dash line 47, to enable operation, then in the slave station 2-2 the control data A is input to the input of the #0 route and no control data is input to the input of the #1 route. Therefore, with reference to the third row in the table of FIG. 6B, the switch setting becomes as shown by S4 of FIG. 5D so that the loop back operation from the #0 route to the #1 route is realized, and the control data A is output from the output of the #0 route and the control data A' is output from the output of the #1 route.

By the operation of the slave station 2-2, the whole state changes from that of the dash line 47 to that of the dash line 48. That is, in the slave station 2-1, the control data A is input to the input of the #0 route as in the state of the dash line 46, but the control data A' is input to the input of the #1 route. Accordingly, with reference to the first row in the table of FIG. 6B, the switch setting changes to the pattern S2 shown in FIG. 5B so that the operation is expanded from the loop back in the slave station 2-1 to the loop back in the slave station 2-2. As a result, at the slave station 2-2, the control data A is output from the output of the #0 route and the control data A' is output from the output of the #1 route.

In the master station 1, the state is not changed regardless of the states of the dash lines 46, 47 and 48.

As a result of the above operation, when the operation of the slave station 2-2 is enabled so that the state changes from that of the dash line 46 to that of the dash line 47, the slave station 2-1 autonomously performs its own distributed control to change to the state shown by the dash line 48, so that the loop back interval is expanded automatically from the slave station 2-1 to the slave station 2-2 and the network is reconstructed.

As described with reference to FIGS. 7A and 7B, the tables of FIGS. 6A and 6B cover all cases of changing the setting of the switch part 26 or 26', and what kind of control data should be output to each WRG 34, based on the control data input from the RRG 31 of each system. The CPU 24 of each system performs the distributed control based on the above mentioned table stored in the MM 25, so that an appropriate automatic reconstruction of a network can be effected in all cases in which the state of each node (station) is changed.

In the above-described embodiment, the CPU 24 performs the distributed control based on the tables stored in the MM 25, but the change of the state of the table shown in FIG. 6A or 6B may be realized by hardware constructed by a sequence circuit and so forth. In this case, the distributed control can be performed at a higher speed.

According to the present invention, by autonomously changing the connecting state of each communication node by itself by using control data, an automatic recovery of any fault and a reconstruction of a network and so forth are possible, and an expansion of the loop back interval and so forth can be realized which could not be conventionally effected.

At this time, the switch rule of the connecting state of the transmission line corresponding to a change of the state of the input control data, and the changing rule of the output control data corresponding to the change of the connecting state, can be previously determined in one means. Therefore, by realizing these rules by reference tables or sequence circuits and so forth, a very simple and high speed distributed control can be performed.

These effects enable the whole processing time to be shortened and a distributed control without control errors is made possible.

We claim:

1. A duplex system of a plurality of communication nodes connectable in a loop network, each of said communication nodes having data transmission/receive means, connected via duplex transmission lines, for transmitting data in two directions, each of said communication nodes comprising:
   loop back means for effecting a loop back operation in response to a predetermined state of signals received from the two directions of the duplex transmission lines; and
   return indication means for adding, to an output signal, a return indication that a received signal was returned when the received signal could not be passed therethrough, each of said communication nodes autonomously beginning and ending the loop back operation in response to the signals received from the two directions.

2. A duplex system according to claim 1, wherein one of said communication nodes is a supervisory node having active/standby indication means for adding, to send signals to be transferred in the two directions of the duplex transmission lines, active/standby indications that each of the two directions in one of an active route and a standby route.

3. A duplex system according to claim 1, wherein the two directions are a #0 route and a #1 route, and
   wherein each of said communication nodes further comprises switching means for switching, in response to active/standby indications of the signals received from the #0 route and the #1 route, between the two directions of the duplex transmission lines.

4. A duplex system according to claim 2, wherein the two directions are a #0 route and a #1 route, and
   wherein said supervisory node comprises switching means for switching, in response to the active/standby indications of the signals received from the

0 route and the #1 route, between the two directions of the duplex transmission lines.

5. A duplex system according to claim 1, wherein the two directions are a #0 route and a #1 route, and
   wherein each of said communication nodes further comprises:
   switching means for switching a connection from the #0 route to the #1 route and from the #1 route to the #0 route; and
   control means for controlling said switching means based on active/standby indications in the signals received from the #0 route and the #1 route.

6. A duplex system according to claim 5, wherein:
   said return indication means in each of said communication nodes comprises means for adding the return indication to a returned signal when said switching means has switched the connection from the #0 route to the #1 route to the #0 route.

7. A duplex system according to claim 6, wherein said control means in each of said communication nodes includes means for storing a data table containing control patterns for driving said switching means, the control patterns including four kinds of receiving patterns consisting of active/standby and active-return/standby-return in the signals received from each of the #0 and #1 routes.

8. A duplex system according to claim 7, wherein each of said communication nodes further comprises loop back releasing means for autonomously releasing the loop back operation when a predetermined pattern is included in the signals received from the two directions.

9. A duplex system according to claim 1,
   wherein said communication nodes comprise a supervisory node and terminal nodes,
   wherein said supervisory node includes active/standby indication means for adding, to the output signal to be transferred in each of the two directions of the duplex transmission lines, active/standby indications that each of the two directions is one of an active route and a standby route,
   wherein the two directions are a #0 route and a #0 route, and
   wherein each of said terminal nodes includes first switching means for switching, in response to the active/standby indications of the signals received from the #0 route, between the two directions of the duplex transmission lines.

10. A duplex system according to claim 9,
    wherein said supervisory node includes second switching means for switching, in response to the return indication in the output signal received from each of the #0 route and the #1 route, between the two directions of the duplex transmission lines,
    wherein said first switching means connects input from the #0 route, and
    wherein said terminal nodes each further includes control means for controlling said first switching means based on the active/standby indications in the signals received from the #0 route and the #1 route.

11. A duplex system according to claim 10,
    wherein said return indication means in each of said terminal nodes includes means for adding the return indication to the output signal when said first switching means therein changes connections,
    wherein said supervisory node and said terminal nodes each further include a data table for storing control patterns for driving said first and second switching means, respectively,
    wherein said control patterns include four kinds of receiving patterns consisting of active/standby and active-return/standby-return in the signals received from the #0 route, and
    wherein said control patterns include four kinds of receiving patterns consisting of active/standby and active-return/standby-return in the signals received from the #1 route.

12. A duplex system according to claim 10, wherein each of said communication nodes further comprises loop back releasing means for automatically releasing the loop back operation in one of said terminal nodes and said supervisory node when a predetermined pattern is included in the signals received from the two directions.

13. A duplex system of a plurality of communication nodes connectable via transmission lines in a duplex network, each of said communication nodes comprising:
    data transmission/receiving means, connected at input/outputs to the transmission lines, for transmitting data in two directions;
    insertion means for inserting control data, indicating a connection state of each of the transmission lines, into each frame transmitted through the transmission lines;
    control data separating means for detecting and separating, at a predetermined time interval, the control data inserted into the frame received from the transmission lines;
    transmission line switch control means for switching the connection state between the input/outputs of each of the transmission lines and the input/outputs of the data transmission/receiving means, based on the control data separated by said control data separating means; and
    control data multiplexing means for multiplexing new control data into the frame to be transmitted by each of the transmission lines, based on the connection state, whereby distributed control is performed at each of said communication nodes to respond to changes in network conditions.

14. A duplex system according to claim 13, wherein the two directions are a #0 route and a #1 route,
    wherein each of said communication nodes further comprises switching means for switching, in response to active/standby indications of signals received from the #0 route and the #1 route, between the two directions of the transmission lines.

15. A duplex system according to claim 14, wherein said communication nodes include a supervisory node and subsidiary nodes.

16. A duplex system according to claim 14, wherein each of said communication nodes further comprises control means for controlling said switching means based on the active/standby indications in the signals received from the #0 route and the #1 route.

17. A duplex system according to claim 16, wherein said insertion means in each of said communication nodes includes means for adding a return indication to a returned signal when said switching means therein changes connections.

18. A duplex system according to claim 17, wherein said control means in each of said communication nodes includes means for storing a data table containing control patterns for driving said switching means, wherein the control patterns include four kinds of receiving patterns consisting of active/standby and active-return/standby-return in the signals received from the #0 route and said control pattern including four kinds of receiving patterns consisting of active/standby and active return/standby return in the signal received from the #1 route.

19. A duplex system according to claim 18, wherein each of said communication nodes further comprises loop back releasing means for automatically releasing the loop back operation when a predetermined pattern is included in the received signals from two directions.

20. A duplex system according to claim 14, wherein said communication nodes comprise a supervisory node and terminal nodes, wherein said supervisory node includes active/standby indication means for adding, to the signals to be transferred to the two directions of the transmission lines, active/standby indications that each of the two directions is one of an active route and a standby route, and wherein said switching means in each of said terminal nodes switches, in response to the active/standby indications of the signals received from the #0 route and the #1 route, between the two directions of the transmission lines.

21. A duplex system according to claim 20, wherein said switching means in said supervisory node switches, in response to the active/standby indications of the signals received from the #0 route and the #1 route, between the two directions of the transmission lines, and wherein each of said terminal nodes further comprises control means for controlling said switching means therein based on the active/standby indications in the signals received from the #0 route and the #1 route.

22. A duplex system according to claim 21, wherein said insertion means in each of said terminal nodes comprises means for adding the return indication to a returned signal when said switching means therein changes connections, wherein said control means in each of said terminal nodes includes data tables for storing control patterns for driving said switching means therein, wherein said supervisory node further comprises control means for controlling switching of said switching means, said control means including data tables for storing control patterns for driving said switching means, and wherein the control patterns include four kinds of receiving patterns consisting of active/standby and active-return/standby-return in the signals received from the #0 route and the #1 route.

23. A duplex system according to claim 22, wherein each of said communication nodes further comprises loop back releasing means for automatically releasing the loop back operation when one of said communication nodes under the loop back operation receives a predetermined pattern in the signals received from the two directions.

* * * * *